United States Patent
Kokaly et al.

[11] 3,902,742
[45] Sept. 2, 1975

[54] PUSH-BLOCK AND DRAWBAR ASSEMBLY FOR TRACTORS

[75] Inventors: Frederick Louis Kokaly, Plainfield; Leon Arnold Wirt, Joilet, both of Ill.

[73] Assignee: Caterpillar Tractor Co., Peoria, Ill.

[22] Filed: Oct. 7, 1974

[21] Appl. No.: 512,196

[52] U.S. Cl. ............................... 280/481; 172/801
[51] Int. Cl. .............................................. B60d 3/00
[58] Field of Search ............ 280/481; 172/801, 699

[56] References Cited
UNITED STATES PATENTS

| | | | |
|---|---|---|---|
| 2,868,579 | 1/1959 | Panasewicz | 280/481 |
| 2,901,846 | 9/1959 | Armington | 172/801 |
| 2,986,276 | 6/1961 | Peterson | 172/801 |
| 3,243,203 | 3/1966 | Hermiz | 280/481 |
| 3,844,369 | 10/1974 | Schroeder | 172/801 X |

*Primary Examiner*—Leo Friaglia
*Attorney, Agent, or Firm*—Phillips, Moore, Weissenberger Lempio & Strabala

[57] ABSTRACT

Mounting means for a combination push-block and drawbar attachment for an earthworking vehicle. The means comprise a pair of mounting brackets straddle-mounted and pinned to the main vehicle frame, and a cross-beam member straddle-mounted on the brackets and pinned thereto. The cross-beam member includes the push-block and drawbar attachment and is pivotally secured to the main frame of the vehicle so that the member may be unpinned from the brackets and pivoted to the ground to provide access to rear-mounted vehicle components. The attachment is readily interchangeable with other attachments by unpinning and removing the crossbeam member from the brackets and frame, or alternatively, by unpinning and removing the mounting means.

10 Claims, 4 Drawing Figures

PUSH-BLOCK AND DRAWBAR ASSEMBLY FOR TRACTORS

CROSS REFERENCE TO RELATED APPLICATIONS

This invention relates to the inventions disclosed in U.S. Patent applications Ser. No. 512,194, filed on 10-7-74, by Albert Gianessi and Leon Wirt, entitled PINNED ON MODULAR ATTACHMENTS WITH INTERCHANGEABLE COMPONENTS and Ser. No. 512,197, filed on 10-7-74, by Glenn H. Stanfield, entitled IMPLEMENT MOUNTING ARRANGEMENT FOR EARTHMOVING EQUIPMENT, both applications being of common assignment herewith.

BACKGROUND OF THE INVENTION

This invention relates to mounting means for mounting modular attachments to an earthmoving vehicle. More particularly, this invention relates to mounting means which function to permit the ready interchangeability of various modular vehicle attachments. The instant mounting means in combination with an attachment mounted thereupon further function as a guard for the vehicle transmission or other component.

The massive size and weight of modern earthworking vehicles present considerable design problems in assuring optimum location of the various component parts and assemblies so that excessive stress-producing forces are not transmitted between, for example, a tractor and its associated implement. Such high stresses in tractor components tend to cause premature failure of these components and of the associated mounting brackets for the implement.

The usual approach has been to increase the size and weight of vulnerable components for added strength. However, such a practice adds significantly to the overall weight of the vehicle, making matters such as transporting the vehicle more difficult in view of legal load limitations.

Further, complementing attachments or implements such as heavy-duty drawbars, push-blocks, hitches, and deep penetrating high load ripper assemblies must be securely but conveniently mounted upon the vehicle by mounting means which permit rapid and efficient substitution of alternate implements.

Additionally, to facilitate manufacture and servicing of earthmoving vehicles, modular component parts, such as the rear-mounted transmission for the crawler tractor described in U.S. Pat. No. 2,971,398, are now employed. Such modular components, however, present additional problems because means must be provided for protecting such components from impact damage during use. Since such vehicles are commonly operated in severe operating environments, protection means have to be sturdy enough to prevent costly damage in the event the vehicle and transmission inadvertently encounter a tree stump, rock or other obstacle. Preferably, such protection means are also of minimum size and weight to avoid undesirable increases in total vehicle weight. Such means should also be sufficiently flexible to provide component accessibility for facilitating periodic vehicle inspections and servicing.

Typical prior art means for mounting attachments such as push-blocks and related attachments include those described in U.S. Pat. Nos. 2,986,827 and 2,998,965 of common assignment herewith, and 3,243,203.

SUMMARY AND OBJECTS OF THE INVENTION

The present invention provides a method and mounting means for mounting a combination drawbar and push-block attachment on an earthworking vehicle so that the attachment is readily interchangeable with other attachments and so that the drawbar and push-block attachment loads are directly and evenly transferred to the main frame of the vehicle, thereby avoiding undue stresses on the mounting components. The mounting means, together with the drawbar and push-block attachment further function to guard rear-mounted vehicle components from impact damage and to provide ready access to such components.

The mounting means of the invention include a pair of laterally-spaced parallel mounting brackets, similar to those described in above-noted copending application Ser. No. 512,194, filed by Gianessi, et al, in combination with a cross-beam member including a drawbar and push-block attachment. The mounting brackets each comprise a pair of triangularly-shaped, laterally-spaced, parallel bracket assemblies including first and second pin-receiving means for receiving pins which can removably secure the brackets to the main frame of the vehicle and which can removably secure the cross-beam member to thus structurally integrate the brackets to provide a rigid, self-contained mounting structure capable of effectively absorbing side-loading. The brackets are straddle-mounted upon the vehicle main frame and cross-beam member over ears thereupon provided for uptimum strength of the mounting structure and for even transference of loads to the vehicle frame.

The cross-beam member of the invention includes a pair of longitudinally-extending members each of which is removably pivotally secured to the main vehicle frame at one end thereof and secured at the opposite end thereof to a laterally-extending member. The cross-beam member is pinned to the mounting brackets through ears formed upon each of the longitudinally-extending members. The cross-beam member includes a drawbar and push-block which extend rearwardly of the laterally-extending member.

The drawbar and push-block attachment may be readily interchanged, for example, with a hitch attachment, such as that described in the aforementioned application Ser. No. 512,194 by merely interchanging the associated cross-beam members. Alternatively, the drawbar and push-block attachment could be exchanged for the ripper attachment described in the aforementioned application Ser. No. 512,197 by substituting the mounting brackets therein described for the brackets embodied in this invention.

It is an object of this invention to provide mounting means for mounting a drawbar and push-block attachment on an earthworking vehicle so that the attachment is readily interchangeable with other vehicle attachments.

It is another object of this invention to provide mounting means for mounting a drawbar and push-block attachment on an earthworking vehicle which together with the attachment, function to protect rear-mounted vehicle components.

It is a further object of this invention to provide mounting means for mounting a drawbar and push-block attachment on an earthworking vehicle which directly and evenly transfer attachment loads to the main frame of the vehicle.

Yet another object of this invention is to provide multi-component mounting means for mounting a push-block and drawbar assembly upon an earthworking vehicle which means facilitate handling of the component parts while providing a rigid, integrated support structure.

Another object of this invention is to provide mounting means for mounting a drawbar and push-block attachment on an earthworking vehicle which means are readily demounted from the vehicle frame and evenly transfer loads thereto and yet are strongly secured to the vehicle frame.

It is yet another object of this invention to provide mounting means for mounting a drawbar and push-block attachment on an earthworking vehicle which provide ready access to rear-mounted vehicle components.

Other objects and advantages of the invention will become apparent from the following description and drawings.

DETAILED DESCRIPTION

The mounting means of this invention, generally indicated at 10, are shown in association with an earthworking vehicle such as a crawler tractor 11 of the type described in U.S. Pat. No. 3,774,708 to Purcell, of common assignment herewith. The tractor has a main frame 12 such as that described in U.S. application Ser. No. 338,314, also of common assignment herewith.

Figure 2:
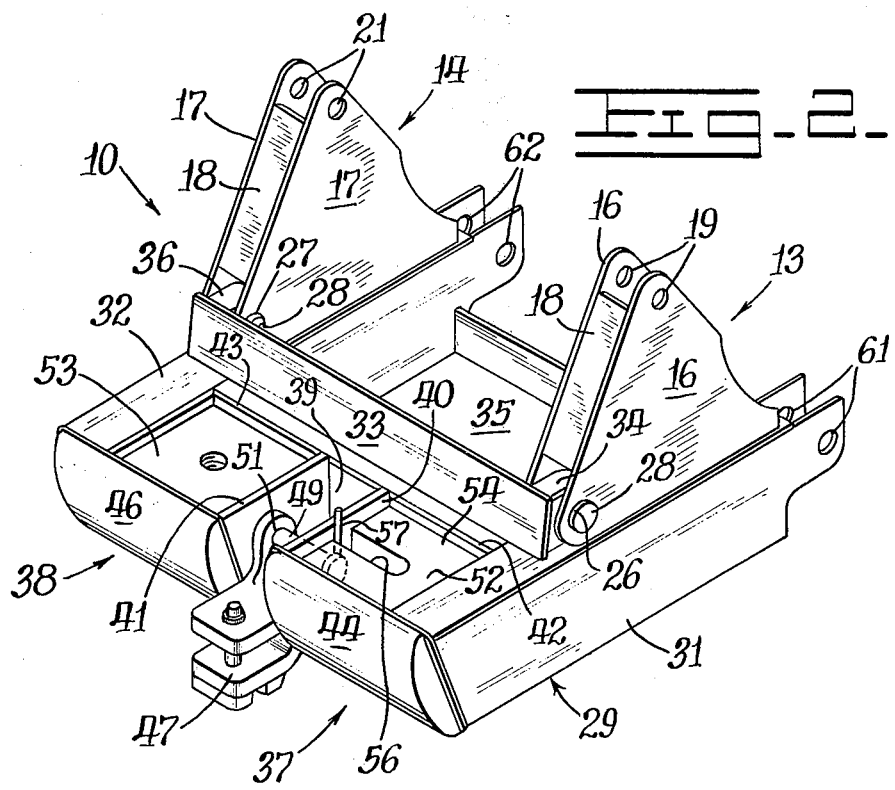
FIG. 2 is a perspective view of the mounting means of FIG. 1 including the drawbar and push-block attachment.

The mounting means 10, as shown in FIG. 2, include right and left vertically-disposed mounting brackets 13 and 14, respectively. Each of the brackets 13 and 14 includes a pair of triangularly-shaped laterally-spaced bracket plates 16 and 17, respectively, each pair of which are fixed in parallel relationship by internal reinforcing plates 18. The brackets 13 and 14 further include first pin-receiving means comprising aligned apertures 19 in the apexes of the bracket plates 16 and aligned apertures 21 in the apexes of the bracket plates 17. The apertures 19 and 21 are respectively disposed for alignment with right and left frame ears 22 and 23, respectively, which are provided on the right and left sides of the frame 12 and which project rearwardly therefrom to engage the bracket plates 16 and 17. The apertures 19 and 21 are adapted for receiving mating pins 24 which removably secure the brackets to the frame 12 so that the bracket plates 16 straddle the right frame ear 22 and the bracket plates 17 straddle the left frame ear 23. The bracket plates 16 and 17 further include second pin-receiving means comprising apertures 26 in the rear side portion of the bracket plates 16 and apertures 27 in the rear side portion of the bracket plates 17 for receiving mating pins 28 which removably secure a cross-beam member 29 to the brackets 13 and 14.

The cross-beam member 29 includes a pair of longitudinally-extending main members 31 and 32 pivotally securable at the forward ends thereof to the right and left sides of the frame 12, respectively. The forward portions of the main members are interconnected by a relatively heavy-gauge bottom panel 35 which affords substantial protection to rear-mounted modular vehicle components. The main members 31 and 32 are joined toward the rearward portions thereof by a laterally-extending plate member 33 disposed between and secured to, as by welding, vetically-extending projections 34 and 36 provided on the main members 31 and 32, respectively. The projections 34 and 36 are straddled by the bracket plates 16 and 17, respectively and engaged therewith by pins 28 inserted through the apertures 26 and 27 and the projections 34 and 36 respectively.

The cross-beam member 29 further includes a push-block comprising two push-block subassemblies generally indicated at 37 and 38 and disposed rearwardly of the laterally-extending plate 33 and laterally spaced to define a partially open area 39 therebetween. The push-block assemblies 37 and 38 each includes an assembly plate 41 longitudinally extending rearwardly of the lateral plate 33 and a rearward portion of the main members 31 and 32. Laterally-extending reinforcing plates 42 and 43 respectively join the main member 31 to the assembly plate 40 and the main member 32 to the assembly plate 41. Laterally-extending solid metal abutment pads 44 and 46 respectively connect the main member 31 to the assembly plate 40 and the main member 32 to the assembly plate 41 to complete the box-like structures of the push-block assemblies 37 and 38.

Figure 1:
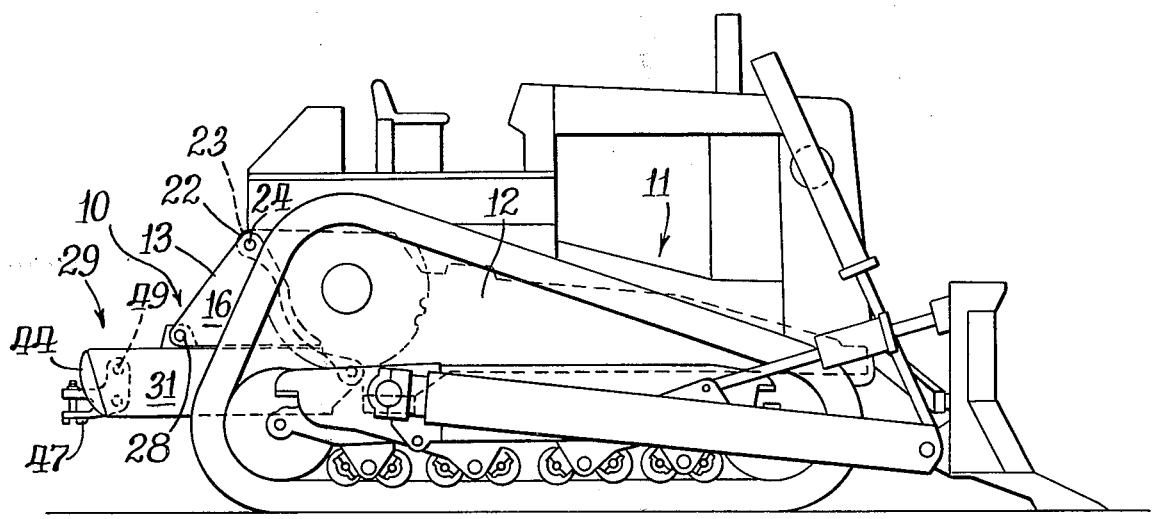
FIG. 1 is an elevation of a crawler tractor including a drawbar and push-block attachment mounted thereupon by the mounting means of this invention.

A drawbar hitch assembly 47 is pivotally mounted in the open area 39 between the assembly plates 40 and 41 by means of a first pin 48 and is held in operative position, as shown in FIGS. 1 and 2, by means of a second pin 49 which is engageable within an aperture 51. When it is desired to employ counterweights in the system, cavities 52 and 53 within the push-block assemblies 37 and 38 accommodate such weights, one of which is shown at 54. The weight 54 includes a slot 56 which permits easy removal of the second hitch pin 49. The pin 49 includes a handle 57 which facilitates removal thereof. When the counterweights 54 are not in use, cover plates (not shown) may be placed over the cavities 52 and 53 to prevent foreign matter from entering.

It should be noted that if the hitch assembly 47 were not required in a particular application, the separate push pads 44 and 46 could be replaced by a single push pad (not shown) which would span the distance between the main members 31 and 32.

Figure 3:
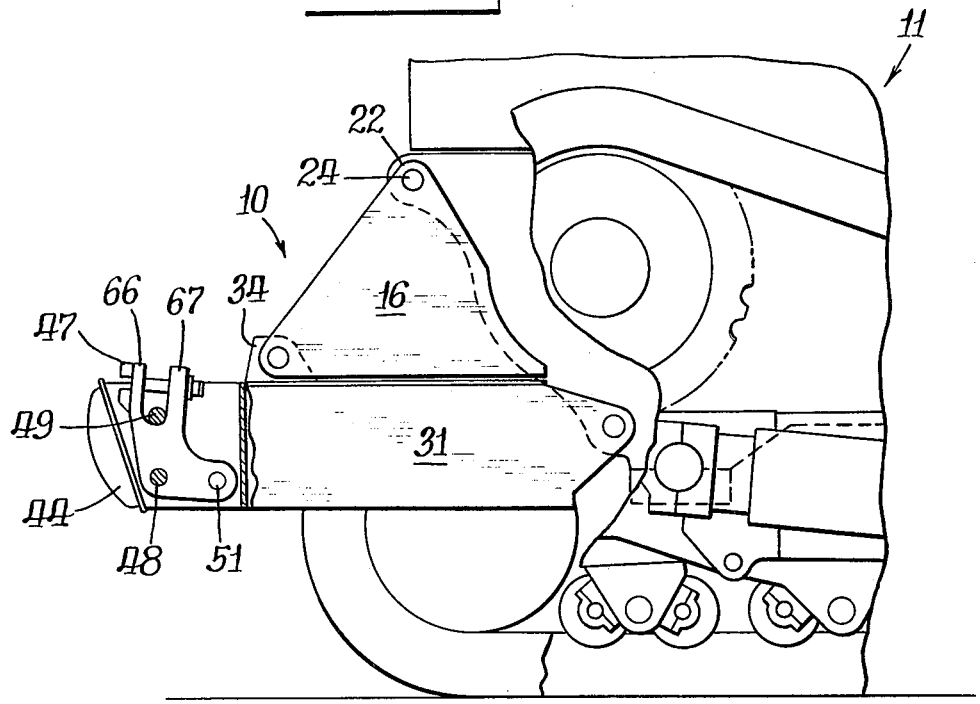
FIG. 3 is a fragmentary elevation of the tractor of FIG. 1 including the mounting means of this invention and a cutaway elevation of the push-block to show the drawbar hitch rotated and pinned in a storage position.

When the work load is such that the power of a second tractor is required to accomplish the intended task, the push-block assemblies 37 and 38 provide a surface comprising the abutment pads 44 and 46 which the blade of the second machine may engage during the pushing operation. Under such conditons, the hitch 47 is preferably rotated 90° out of the way to its storage position as illustrated in FIG. 3. The hitch 47 is held in the storage position by the second pin 49 being disposed between bifurcated portions 66 and 67 of the hitch 47. In this position, the hitch does not extend beyond the abutment pads 44 and 46 and is protected from impact damage which could be inflicted by the auxiliary tractor during the pushing operation. While in the working position, the hitch 47 provides means for securing cables or other equipment for pulling or towing to the tractor 11.

Figure 4:
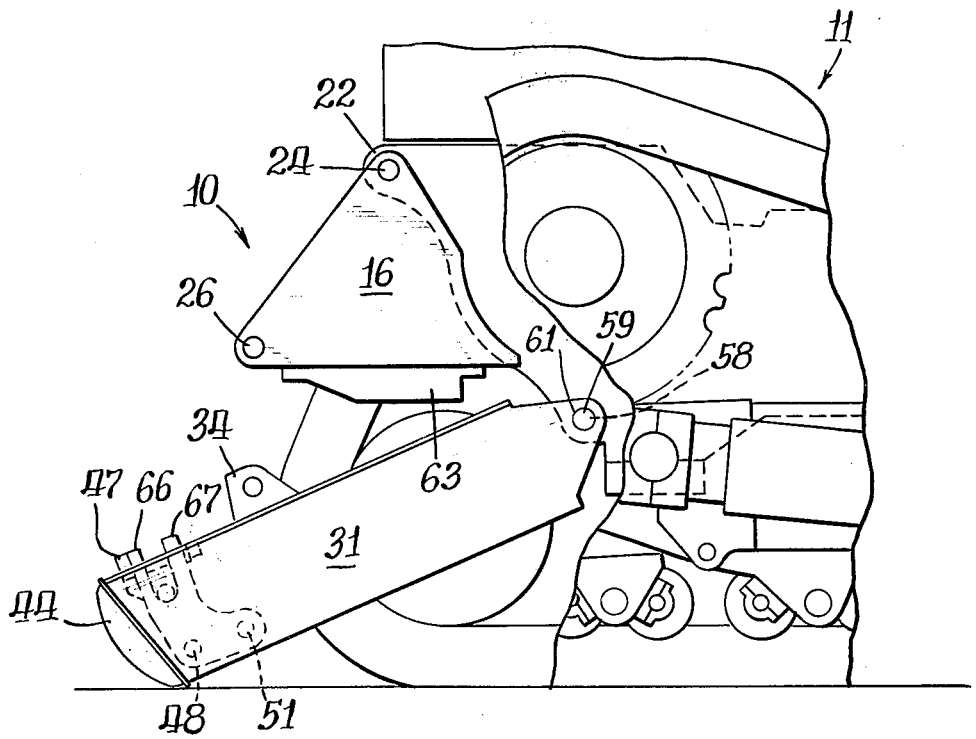
FIG. 4 is an elevation of a tractor similar to that shown in FIG. 3 illustrating the drawbar and push-block attachment unpinned from the mounting brackets and pivoted downward for access to a rear-mounted vehicle component.

As best shown in FIG. 4, the main members 31 and 32 are secured to vehicle frame 11 by pin means 58 and 59 engaged within apertures 61 and 62 disposed on the forwardmost portions of the main members 31 and 32 respectively. Ready access to a rear-mounted vehicle component such as a transmission 63 may thus be afforded by merely removing the pins 28 from the apertures 26 and 27 and the projections 34 and 36 to unpin the cross-beam member 29 from the brackets 13 and 14 and to subsequently pivot the cross-beam member to the ground, as shown in FIG. 4.

It is apparent that the invention provides mounting means for a drawbar and push-block attachment which means permit the ready interchangeability of this attachment with other attachments for earthworking vehicles. The invention further provides mounting means which directly and evenly transfer loads exerted by the push-block and drawbar attachment to the main frame of the vehicle and thus the wear life of the mounting structure components is extended without increasing the size or weight of the components. Further the invention provides protection for rear-mounted vehicle components without increasing total vehicle weight and facilitates access to such components.

Although the invention has been described with respect to particular embodiments, it should be apparent that numerous modifications and alterations are possible within the purview of the inventive concepts. No limitation is intended except by the scope of the appended claims.

We claim:

1. A push-block assembly for an earthmoving vehicle having a main frame comprising; a pair of laterally spaced-apart upstanding bracket means, first aperture means in said pair of bracket means, second aperture means in said main frame, first removable pin means receivable in said first and second aperture means for releasably pivotally securing said bracket means to said main frame, push-block means having third aperture means therein, fourth aperture means in said bracket means, second removable pin means receivable in said third and fourth aperture means for releasably securing said push-block means to said bracket means, said main frame further including fifth aperture means, and said push-block means including sixth aperture means, and third pin means receivable within said fifth and sixth aperture means for securing said push-block means to said main frame.

2. The invention of claim 1 wherein said pair of upstanding bracket means each include a pair of spaced plate members spaced apart by structural members and containing said first and fourth aperture means.

3. The invention of claim 2 wherein said push-block means include a pair of longitudinally-extending main support beams and laterally-extending cross-beam means supportively connected between said pair of longitudinally-extending main support beams, said longitudinally-extending main support beams containing said third and sixth aperture means.

4. The invention of claim 3 wherein said cross-beam means include push-block pad means extending substantially completely laterally from one of said pair of longitudinally extending main support beams.

5. The invention of claim 3 wherein said cross-beam means include a plurality of push-block abutment pads extending between said pair of longitudinally-extending main support beams, and hitch means disposed between two of said plurality of push-block abutment pads.

6. The invention of claim 5 wherein said hitch means is pivotally mounted between said abutment pads, for selective disposition in a first position in which it extends longitudinally beyond the longitudinal confines of said abutment pads or in a second storage position in which it does not extend beyond the longitudinal confines of said abutment pads.

7. The invention of claim 5 wherein said abutment pads are solid noncushioned members.

8. The invention of claim 6 wherein said cross-bar means include locking means for latching said hitch means in said second storage position.

9. The invention of claim 5 wherein said cross-beam means include cavity means for selectively containing counterweights for said earthmoving vehicle, cover means for said cavity means when said cavity means are not containing counterweights.

10. The invention of claim 2 wherein said spaced plate members are substantially triangularly shaped, and wherein said first and fourth aperture means are disposed proximate apexes of said substantially triangularly-shaped plate members.

* * * * *